(12) United States Patent
Ricardi et al.

(10) Patent No.: US 11,593,918 B1
(45) Date of Patent: Feb. 28, 2023

(54) GRADIENT-BASED NOISE REDUCTION

(71) Applicant: Apple Inc., Cupertino, CA (US)

(72) Inventors: Fabio Ricardi, Menlo Park, CA (US); Gijesh Varghese, Milpitas, CA (US); Wu Cheng, Millbrae, CA (US); Claus Moelgaard, Los Gatos, CA (US); Todd Sachs, Palo Alto, CA (US); Farhan Baqai, Fremont, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/978,113

(22) Filed: May 12, 2018

Related U.S. Application Data

(60) Provisional application No. 62/506,727, filed on May 16, 2017.

(51) Int. Cl.
*G06T 5/00* (2006.01)
*G06T 7/13* (2017.01)
*G06V 10/46* (2022.01)
*G06T 3/40* (2006.01)

(52) U.S. Cl.
CPC ............ *G06T 5/002* (2013.01); *G06T 3/4015* (2013.01); *G06T 7/13* (2017.01); *G06V 10/46* (2022.01); *G06V 10/473* (2022.01)

(58) Field of Classification Search
None
See application file for complete search history.

(56) References Cited

U.S. PATENT DOCUMENTS

| 5,003,618 | A * | 3/1991 | Meno | G06T 5/20 |
| | | | | 382/261 |
| 6,681,054 | B1 * | 1/2004 | Gindele | G06T 5/20 |
| | | | | 382/254 |
| 8,879,841 | B2 | 11/2014 | Cohen et al. | |
| 9,489,722 | B2 | 11/2016 | Jiang | |
| 2006/0072844 | A1 * | 4/2006 | Wang | G06T 5/20 |
| | | | | 382/254 |
| 2006/0146192 | A1 * | 7/2006 | Tashiro | H04N 9/64 |
| | | | | 348/572 |
| 2011/0043489 | A1 * | 2/2011 | Yoshimoto | G06F 3/04186 |
| | | | | 345/175 |
| 2011/0069875 | A1 * | 3/2011 | Goto | A61B 6/032 |
| | | | | 382/131 |
| 2013/0076939 | A1 * | 3/2013 | Kaizu | H04N 9/04515 |
| | | | | 348/224.1 |

(Continued)

FOREIGN PATENT DOCUMENTS

CN 101877122 B 12/2012

OTHER PUBLICATIONS

Harrabi et al. "Isotropic and anisotropic filtering techniques for image denoising: A comparative study with classification", 2012 16th IEEE Mediterranean Electrotechnical Conference (Year: 2012).*

(Continued)

*Primary Examiner* — Randolph I Chu
(74) *Attorney, Agent, or Firm* — Fernando & Partners, LLP

(57) ABSTRACT

In one embodiment, a method includes obtaining an image comprising a plurality of pixels, determining, for a particular pixel of the plurality of pixels, a gradient value, classifying, based on the gradient value, the particular pixel into a flat class or one of a plurality of edge classes, and denoising the particular pixel based on the classification.

19 Claims, 4 Drawing Sheets

(56) References Cited

U.S. PATENT DOCUMENTS

| | | | | |
|---|---|---|---|---|
| 2014/0140416 A1* | 5/2014 | Yamazaki | ............. | H04N 19/14 |
| | | | | 375/240.25 |
| 2014/0140636 A1 | 5/2014 | Jiang et al. | | |
| 2014/0177022 A1* | 6/2014 | Saisho | ................ | G02B 3/0006 |
| | | | | 359/205.1 |
| 2015/0041757 A1* | 2/2015 | Fujii | .................. | H01L 33/0095 |
| | | | | 257/13 |
| 2016/0063685 A1 | 3/2016 | Tuzel et al. | | |
| 2016/0140696 A1* | 5/2016 | Yamada | ................... | G06T 5/10 |
| | | | | 382/167 |
| 2016/0284065 A1* | 9/2016 | Cohen | ...................... | G06T 5/20 |
| 2017/0223352 A1* | 8/2017 | Kim | ..................... | H04N 19/117 |
| 2017/0243332 A1* | 8/2017 | Takahashi | ............. | G06V 10/34 |

OTHER PUBLICATIONS

Bernd Girod, Digital Image Processing: Linear Image Processing and Filtering , © 2013 Stanford University (Year: 2013).*

* cited by examiner

GRADIENT-BASED NOISE REDUCTION

RELATED APPLICATION

This application claims priority to U.S. Provisional Patent Application No. 62/506,727, filed on May 16, 2017, entitled "Gradient-based Noise Reduction," the entire contents of which are incorporated herein by reference.

TECHNICAL FIELD

The present disclosure relates generally to image processing, and in particular, to gradient-based noise reduction of captured images.

BACKGROUND

When an image is captured using a camera, particular in low-light conditions, the resulting image can include noise in addition to a representation to the captured scene. Further, noise artifacts can be introduced to an image by various compression methods or other processing. Accordingly, in various circumstances, denoising algorithms can be applied to an image to reduce the visibility of such noise.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
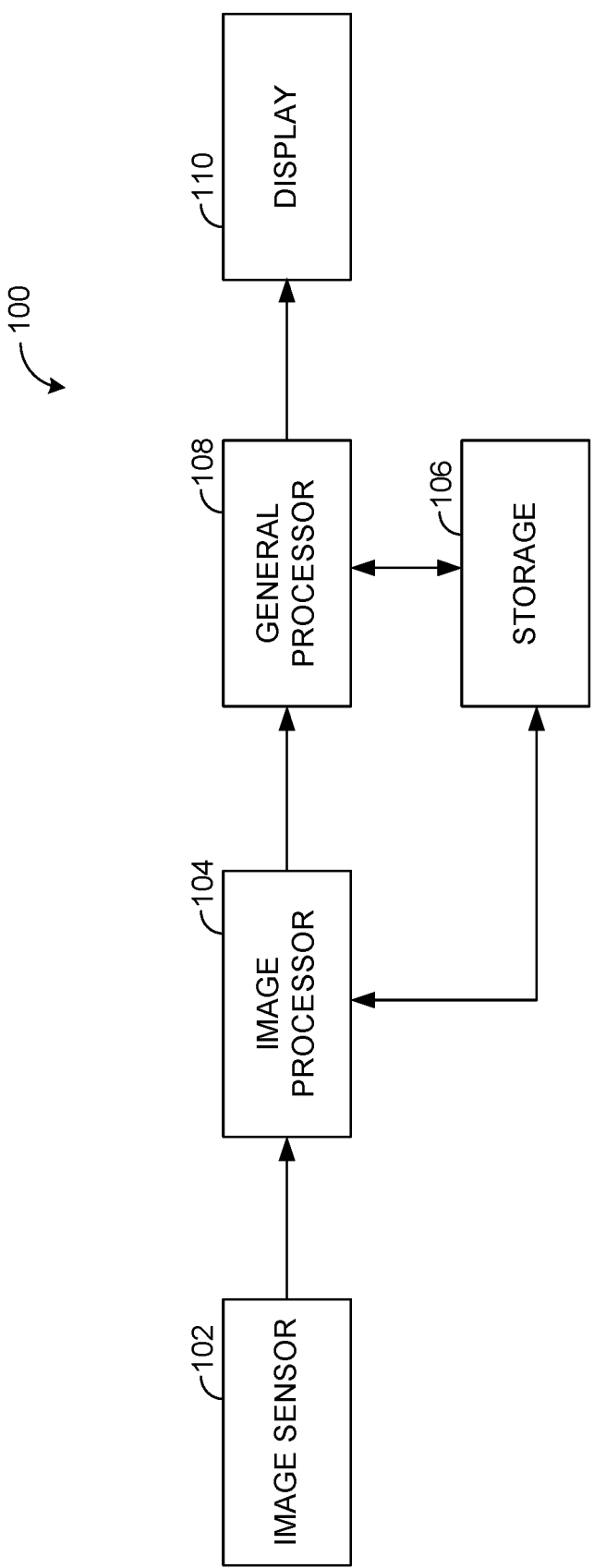
FIG. 1 is a functional block diagram of an electronic device including an image processor.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

FIG. 1 is a functional block diagram of an electronic device 100. In various implementations, the electronic device 100 is a camera, a phone, a tablet, or a personal computer. The electronic device 100 includes an image sensor 102 that captures an image, an image processor 104 that performs pre-processing on the image, a general processor 108 that performs noise reduction on the image, storage 106 for storing the image in various states (with or without pre-processing and/or noise reduction), and a display 110 for displaying the image.

The image sensor 102 captures an image as raw image data. In various implementations, the image sensor 102 includes a CCD (charge-coupled device) image sensor or a CMOS (complementary metal-oxide semiconductor) image sensor. The image sensor is coupled to, and provides raw image data to, an image processor 104.

The image processor 104 receives the raw image data from the image sensor 102 and pre-processes the raw image data to produce pre-processed image data. In various implementations, the pre-processing includes, for example, converting a RAW image into an RGB image or YCbCr image. In various implementations, the pre-processing further includes gain adjustment, color enhancement, or filtering as described further below.

In various implementations, the image processor 104 stores the pre-processed image data in the storage 106, where it is retrieved by the general processor 108. The general processor 108 performs noise reduction on the pre-processed image data to produce processed image data. In various implementations, the processed image data is stored in the storage 106 or displayed on the display 110.

Figure 2:
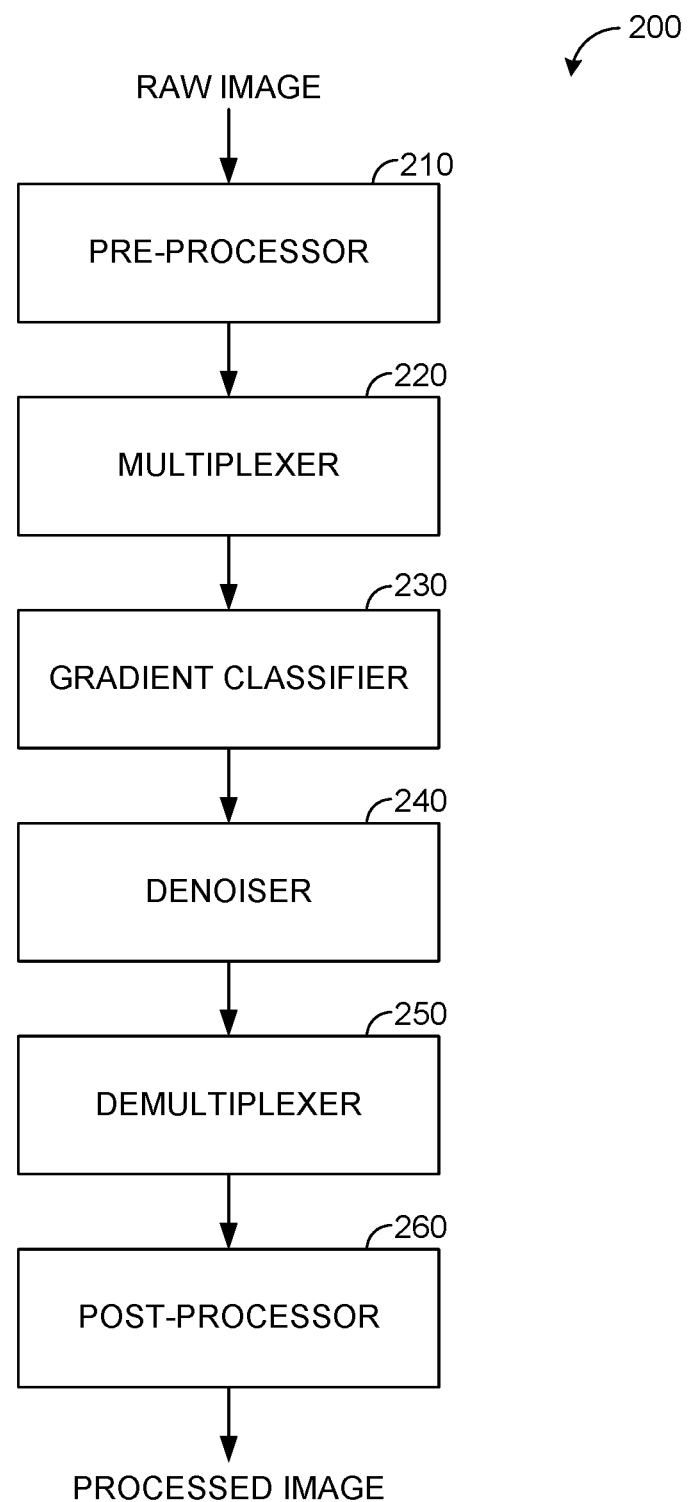
FIG. 2 is a functional block diagram of an image processing system 200 in accordance with some implementations

FIG. 2 is a functional block diagram of an image processing system 200 in accordance with some implementations. The image processing system 200 receives a RAW image including a plurality of pixels arranged in matrix. The raw image can be received, for example, from an image sensor, such as the image sensor 102 of FIG. 1.

The raw image is fed into a pre-processor 210 that converts the RAW image into a color image including a plurality of color components, each color component including a plurality of pixels arranged in a matrix. In various implementations, the pre-processor 210 converts the RAW image into an RGB image including a red component, a green component, and a blue component. In various implementations, the pre-processor 210 converts the RAW image into a YCbCr image including a luma component, a first chroma component, and a second chroma component. In converting the RAW image, the pre-processor 210 can apply a demosaic algorithm to generate the color image from incomplete color samples output from an image sensor overlaid with a color filter array (CFA), e.g., a Bayer filter array.

In various implementations, the pre-processor 210 performs additional processing of the color image. The pre-processor 210 can apply gain to the color image, where high gain is applied in low-light conditions and low gain is applied in high-light conditions. The pre-processor 210 can white balance (or otherwise color correct) the color image, applying different gains to different color components depending on illumination and illuminant type. The pre-processor 210 can blur, sharpen, or otherwise filter the color image. The pre-processor 210 can compress the image with either lossy or lossless compression.

Thus, in various implementations, the output of the pre-processor is a color image including a plurality of color components, e.g., multiple matrices of pixels. Each matrix of pixels (itself an "image") is fed into a multiplexer 220. The multiplexer 220 multiplexes each color component into a plurality of frequency band components. For example, the multiplexer 220 can multiplex a red component into a low frequency red component and a high frequency red component. As another example, the multiplexer 220 can multiplex a luma component into a very low frequency luma component, a low frequency luma component, a high frequency luma component, and a very high frequency luma component. In some embodiments, such as when the color image is an RGB image, the multiplexer 220 can multiplex each component. In some embodiments, such as when the color image is a YCbCr image, the multiplexer 220 can multiplex only one of the components, e.g., the luma component, and not multiplex the other components, e.g., the chroma components.

In various implementations, the multiplexer 220 down-samples lower frequency components, e.g., components other than the highest frequency component. For example, the multiplexer 220 can down-sample the low frequency red component by 2 and not down-sample the high frequency red component. As another example, the multiplexer can down-sample the very low frequency luma component by 8, down-sample the low frequency luma component by 4, down-sample the high frequency luma component by 2, and not down-sample the very high frequency component.

Accordingly, in various implementations, the output of the multiplexer 220 is a plurality of frequency components, e.g., multiple matrices of pixels, for at least one of a plurality of color components. Each matrix of pixels (itself an "image") is fed into a gradient classifier 230. The gradient classifier 230 classifies each pixel of a received image (which, as described above, may be a component of an image) into a flat class or one of a plurality of edge classes.

In order to classify the pixels of the image, in various implementations, the gradient classifier 230 determines a gradient value for each pixel of the image. In some embodiments, the gradient classifier 230 applies Sobel operators to estimate horizontal gradients and vertical gradients of the image. For a pixel of the image at horizontal location x and vertical location y, denoted A(x,y), the horizontal gradient value of the pixel, denoted $G_h(x,y)$, can be determined as:

$$G_h(x, y) = \begin{bmatrix} -1 & 0 & 1 \\ -2 & 0 & 2 \\ -1 & 0 & 1 \end{bmatrix} * \begin{bmatrix} A(x-1, y-1) & A(x, y-1) & A(x+1, y-1) \\ A(x-1, y) & A(x, y) & A(x+1, y) \\ A(x-1, y+1) & A(x, y+1) & A(x+1, y+1) \end{bmatrix}.$$

Similarly, the vertical gradient value of the pixel, denoted $G_v(x,y)$, can be determined as:

$$G_v(x, y) = \begin{bmatrix} -1 & -2 & -1 \\ 0 & 0 & 0 \\ 1 & 2 & 1 \end{bmatrix} * \begin{bmatrix} A(x-1, y-1) & A(x, y-1) & A(x+1, y-1) \\ A(x-1, y) & A(x, y) & A(x+1, y) \\ A(x-1, y+1) & A(x, y+1) & A(x+1, y+1) \end{bmatrix}.$$

In various implementations, the gradient classifier 230 uses the horizontal gradient value and the vertical gradient value to determine a gradient strength value. In various implementations, the gradient classifier 230 determines the gradient strength value for a pixel, denoted G(x,y), as the square root of the sum of the squares of the horizontal gradient value and the vertical gradient value, e.g., as:

$$G(x,y) = \sqrt{G_h^2(x,y) + G_v^2(x,y)}.$$

In various implementations, the gradient classifier 230 determines the gradient strength value by other means, such as the arithmetic mean of the horizontal gradient value and vertical gradient value, the quadratic mean of the horizontal gradient value and vertical gradient value (proportional to the above by a constant), the cubic mean of the horizontal gradient value and the vertical gradient value, or the maximum of the horizontal gradient value and the vertical gradient value.

In various implementations, the gradient classifier 230 also uses the horizontal gradient value and the vertical gradient value to determine a gradient direction value. In various implementations, the gradient classifier 230 determines the gradient direction value for a pixel, denoted Θ(x,y), as the arctangent of the vertical gradient value divided by the horizontal gradient value, e.g., as:

$$\Theta(x, y) = \operatorname{atan}\left(\frac{G_v(x, y)}{G_h(x, y)}\right).$$

In various implementations, the gradient classifier 230 determines the gradient direction value by other means, such as selecting a first value (e.g., 1) when the horizontal gradient value is greater than the vertical gradient value and selecting a second value (e.g., −1) when the vertical gradient value is greater than the horizontal gradient value.

In various implementations, the gradient classifier 230 classifies a pixel based on the gradient value of the pixel, e.g., based on the gradient strength value of the pixel. In some embodiments, the gradient classifier 230 classifies a pixel into a flat class based on the gradient strength value being less than or equal to an edge threshold and classifies a pixel into one of a plurality of edge classes based on the gradient strength value being greater than the edge threshold. In various implementations, the gradient classifier 230 selects the one of the plurality of edge classes based on the gradient direction value.

In various implementations, the gradient classifier 230 classifies a pixel into a flat class or one of two edge classes (e.g., a horizontal edge class or a vertical edge class). Thus, in some embodiments, the gradient classifier 230 classifies a pixel into a flat class if the gradient strength value is below an edge threshold, classifies the pixel into a horizontal edge class if the gradient strength value is above the edge threshold and the gradient direction value is within a first set of values (e.g., between π/4 and 3π/4 or between −π/4 and −3π/4), and classifies the pixel into a vertical edge class if the gradient strength value is above the edge threshold and the gradient direction value is within a second set of values (e.g., between −π/4 and π/4 or between 3π/4 and −3π/4).

In various implementations, the gradient classifier 230 classifies a pixel into a flat class or one of four edge classes. Thus, in some embodiments, the gradient classifier 230 classifies a pixel into a flat class if the gradient strength value is below an edge threshold, classifies the pixel into a horizontal edge class if the gradient strength value is above the edge threshold and the gradient direction value is within a first set of values, classifies the pixel into a diagonal slash class if the gradient strength value is above the edge threshold and the gradient direction value is within a second set of values, classifies the pixel into a vertical class if the gradient strength value is above the edge threshold and the gradient direction value is within a third set of values, and classifies the pixel into a diagonal backslash class if the gradient strength value is above the edge threshold and the gradient direction value is within a fourth set of values.

In various implementations, the gradient classifier 230 classifies, based on the gradient strength value, a pixel into a flat class, one of a first set of edge classes, or one of second set of edge classes. If classified into one of the sets of edge classes, the gradient classifier 230 classifies the pixel based on the gradient direction value. Thus, in some embodiments, the gradient classifier 230 classifies a pixel into a flat class if the gradient strength value is below a weak-edge threshold, classifies the pixel into a weak horizontal edge class if the gradient strength value is between the weak-edge threshold and a strong-edge threshold and the gradient direction value is within a first set of values, classifies the pixel into a strong horizontal edge class if the gradient strength value is above the strong-edge threshold and the gradient direction value is within the first set of values, classifies the pixel into a weak vertical edge class if the gradient strength value is between the weak-edge threshold and the strong-edge threshold and the gradient direction value is within a second set of values, and classified the pixel into a strong vertical edge class if the gradient strength value is above the strong-edge threshold and the gradient direction value is within the second set of values.

The edge threshold can be based on a number of factors. In various implementations, the edge threshold is based on a noise value of the pixel derived from a noise model such as the noise model described in U.S. patent application Ser. No. 14/474,103, filed Aug. 30, 2014, and herein incorporated by reference in its entirety. As a larger edge threshold mitigates isolated pixel artifacts and smooth edges as compared to a lower edge threshold, increasing the edge threshold where noise it expected due to a noise model most strongly mitigates this noise when it most expected.

In various implementations, the edge threshold is based on a distance of the pixel from the center of the image. As the image sensor is likely to include a lens with more distortion or loss occurring further from the center of the lens, an increased edge threshold further from the center of the image most strongly mitigates this noise where it is most expected.

In various implementations, the edge threshold is based on a light level of the image. As noise is more likely to be present or effective at low-noise levels, an increased edge threshold in low-light situations most strongly mitigates this noise when it is most expected or, at least, expected to have the strongest effect.

Although the classification methods above employ 3×3 Sobel operators, in various implementations, 5×5 Sobel operators or larger Sobel operators can be used. In various implementations, other edge detection methods can be employed, such as Canny, Laplacian of Gaussian, Difference of Gaussians, Harris, etc., and used to classify the pixel into one of the set of classes.

The output of the gradient classifier 230 is, for each received image (which may be a component of an image), the received image itself and classifications for each pixel of the image. These outputs are fed into a denoiser 240. Thus, in various implementations, the denoiser 240 receives a plurality of images, each being a frequency component of a color component of an image that has been decomposed. With each of the plurality of images, the denoiser 240 receives a classification of each pixel as being classified into a flat class or one of plurality of edge classes.

For at least one of the received images, the denoiser 240 denoises pixels of the image based on the classification. In various implementations, if a pixel is classified into a flat class, the denoiser 240 applies an isotropic denoising to the pixel and if the pixel is classified into one of the plurality of edge classes, the denoiser 240 applies a respective anisotropic denoising to the pixel. For example, if the pixel is classified into a horizontal edge class, the denoiser 240 applies an anisotropic horizontal denoising to the pixel and, if the pixel is classified into a vertical edge class, the denoiser 240 applies an anisotropic vertical denoising to the pixel.

In various implementations, the denoiser 240 applies a respective mask to a pixel of the image based on the pixel being classified into a respective class. Accordingly, the denoiser 240 stores a set of masks respectively corresponding the set of classes. Applying the mask includes determining a weighted average, defined by the mask, of a neighborhood of pixels surrounding the pixel. This weighted average becomes the pixel value for the corresponding pixel of a denoised image.

In various implementations, the masks are defined by a constant in a first dimension and a Gaussian in a second dimension. Thus, a class of 3×3 masks may be as follows:

$$M_1 = \frac{1}{9}\begin{bmatrix} 1 & 1 & 1 \\ 1 & 1 & 1 \\ 1 & 1 & 1 \end{bmatrix} \quad M_2 = \frac{1}{6}\begin{bmatrix} 0.5 & 0.5 & 0.5 \\ 1 & 1 & 1 \\ 0.5 & 0.5 & 0.5 \end{bmatrix} \quad M_3 = \frac{1}{6}\begin{bmatrix} 0.5 & 1 & 0.5 \\ 0.5 & 1 & 0.5 \\ 0.5 & 1 & 0.5 \end{bmatrix}$$

Thus, for isotropic denoising, where the pixel is classified into a flat class, $M_1$ can be used, defined as constant in a first dimension and a constant in second dimension (e.g., a Gaussian with infinite width in the second dimension). For anisotropic denoising, where the pixel is classified into a horizontal edge class, $M_2$ can be used, defined as a constant in a horizontal dimension and a Gaussian (with a half-maximum width of two) in a vertical dimension. For anisotropic denoising, where the pixel is classified into a vertical edge class, $M_3$ can be used, defined as a constant in a vertical dimension and a Gaussian (with a half-maximum width of two) in a horizontal direction.

Similarly, a class of 5×5 masks, including a flat mask, a horizontal edge mask, a vertical edge mask, a diagonal slash mask, and a diagonal backslash mask, may be, approximately, as follows:

$$M_1 = \frac{1}{9}\begin{bmatrix} 1 & 1 & 1 \\ 1 & 1 & 1 \\ 1 & 1 & 1 \end{bmatrix} \quad M_2 = \frac{1}{6}\begin{bmatrix} 0.5 & 0.5 & 0.5 \\ 1 & 1 & 1 \\ 0.5 & 0.5 & 0.5 \end{bmatrix} \quad M_3 = \frac{1}{6}\begin{bmatrix} 0.5 & 1 & 0.5 \\ 0.5 & 1 & 0.5 \\ 0.5 & 1 & 0.5 \end{bmatrix}$$

$$M_4 = \frac{1}{4.8}\begin{bmatrix} 0.1 & 0.4 & 1 \\ 0.4 & 1 & 0.4 \\ 1 & 0.4 & 0.1 \end{bmatrix} \quad M_5 = \frac{1}{4.8}\begin{bmatrix} 1 & 0.4 & 0.1 \\ 0.4 & 1 & 0.4 \\ 0.1 & 0.4 & 1 \end{bmatrix}$$

The output of the denoiser 240 is, for each received image (which may be a component of an image), a denoised image. These outputs are fed into a demultiplexer 250. The demultiplexer combines the received denoised images to create a composite image that is fed into the post-processor 260. The post-processor 260 can perform similar functions as the pre-processor, including filtering and color correction. The output of the post-processor 260 is a processed image which can be stored or displayed.

Figure 3:
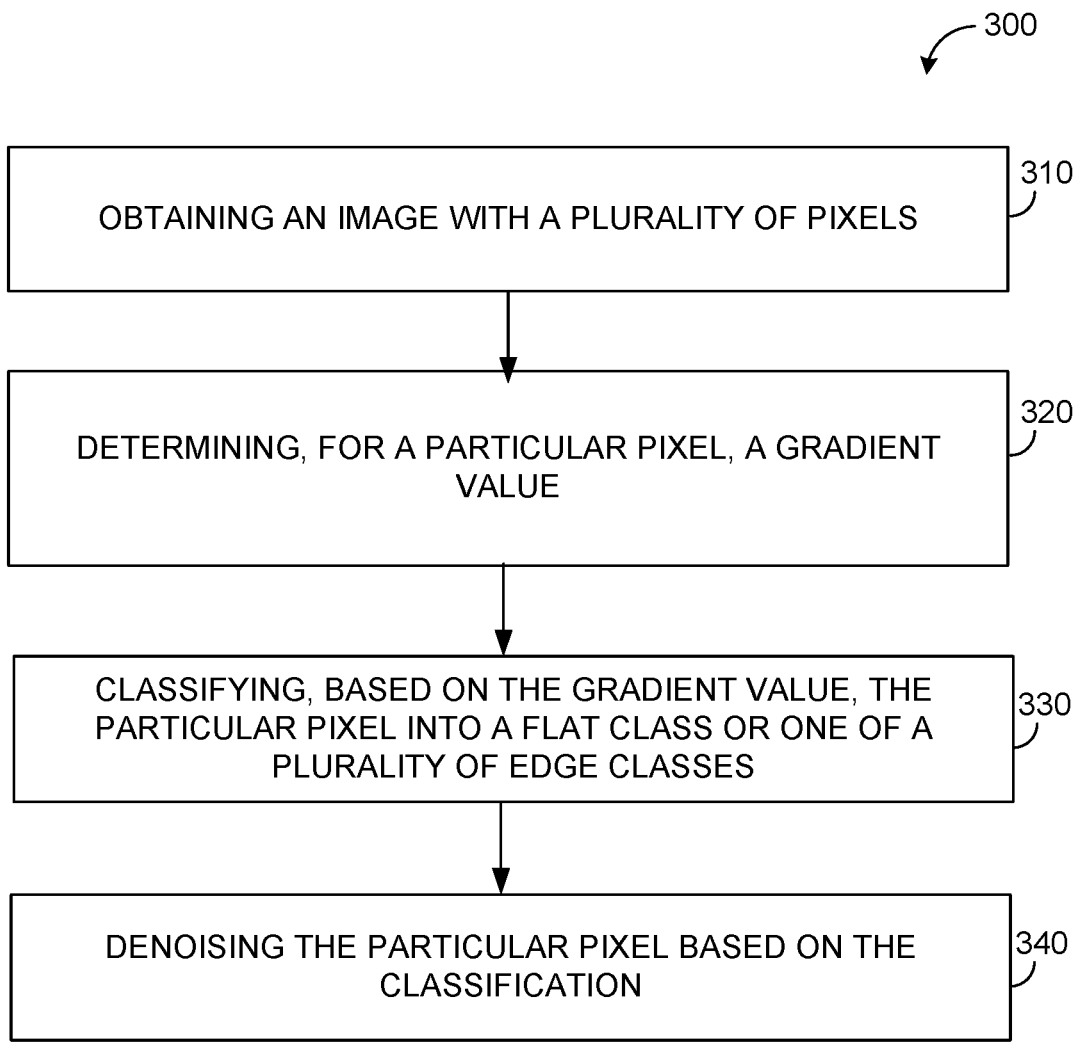
FIG. 3 is a flowchart representation of a method of denoising an image in accordance with some implementations.

FIG. 3 is a flowchart representation of a method 300 of denoising an image in accordance with some implementations. In some implementations (and as detailed below as an example), the method 300 is performed by an image processing system (or a portion thereof), such as the image processing system 200 of FIG. 2. In some implementations, the method 300 is performed by a general processor, such as the general processor 108 of FIG. 1. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, the method 300 includes classifying a pixel of an image into a flat class or one of a plurality of edge classes and denoising the pixel based on the classification.

The method 300 begins, at block 310, with the image processing system obtaining an image comprising a plurality of pixels. In various implementations, the image processing system obtains the image from an image sensor, such as the image sensor 102 of FIG. 1, an image processor, such as the image processor 104 of FIG. 1, storage, such as the storage 106 of FIG. 1, a pre-processor, such as the pre-processor 210 of FIG. 2, or a multiplexer, such as the multiplexer 220 of FIG. 2.

In various implementations, the image is a color component of an RGB image (or frequency component thereof). Thus, in some embodiments, the method 300 includes obtaining a RAW image and converting the RAW image into an RGB image comprising a red component, a blue component, and a green component. In various implementations, the image is a luma component of a YCbCr image. Thus, in some embodiments, the method 300 includes obtaining a RAW image and converting the RAW image into a YCbCr image comprising a luma component, a first chroma component, and a second chroma component. In various implementations, the method 300 includes converting an RGB image into a YCbCr image.

In various implementations, the image is a frequency component of a wideband image. Thus, in some embodiments, the method 300 includes obtaining a wideband image (which can be a color component of a color image including a plurality of color components, such as a luma component or a green component). The method 300 can further include multiplexing the wideband image to produce a plurality of frequency band components. The method 300 can further include down-sampling at least one of the plurality of frequency band components (e.g., all except the frequency band component containing the highest frequencies of the wideband image). In some embodiments, the image is a down-sampled one of the plurality of frequency components.

In various implementations, the image takes other forms, such as a grayscale image, a RAW image, or a compressed image.

The method 300 continues, at block 320, with the image processing system determining, for a particular pixel of the plurality of pixels, a gradient value. Although the following steps of the method 300 are described as generally being performed on a particular pixel, it is to be appreciated that the method 300 can be performed on many pixels of the image, including all the pixels of the image. In various implementations, pixels at the edges of an image are processed differently than pixels in the middle of the image.

Further, although the method 300 can be performed on a single component of a multi-component image (e.g., a frequency component and/or a color component), it is to be appreciated that the method 300 can be performed on multiple components, including all of the components. However, in some embodiments, the method 300 is performed on the pixels of a luma component of an YCrCb image, but not performed on the chroma components of the YCrCb image.

In various implementations, the image processing system determines the gradient value by determining a horizontal gradient value and a vertical gradient value. In various implementations, the image processing system determines the horizontal gradient value and the vertical gradient value by applying a Sobel operator to the plurality of pixels of the image. As noted above, for the particular pixel at horizontal location x and vertical location y, denoted A(x,y), the horizontal gradient value of the pixel, denoted $G_h(x,y)$, can be determined as:

$$G_h(x, y) = \begin{bmatrix} -1 & 0 & 1 \\ -2 & 0 & 2 \\ -1 & 0 & 1 \end{bmatrix} * \begin{bmatrix} A(x-1, y-1) & A(x, y-1) & A(x+1, y-1) \\ A(x-1, y) & A(x, y) & A(x+1, y) \\ A(x-1, y+1) & A(x, y+1) & A(x+1, y+1) \end{bmatrix}.$$

Similarly, the vertical gradient value of the pixel, denoted $G_v(x,y)$, can be determined as:

$$G_v(x, y) = \begin{bmatrix} -1 & 2 & 1 \\ 0 & 0 & 0 \\ 1 & 2 & 1 \end{bmatrix} * \begin{bmatrix} A(x-1, y-1) & A(x, y-1) & A(x+1, y-1) \\ A(x-1, y) & A(x, y) & A(x+1, y) \\ A(x-1, y+1) & A(x, y+1) & A(x+1, y+1) \end{bmatrix}.$$

In various implementations, the image processing system determines the gradient value by determining a gradient strength value. In various implementations, the image processing system determines the gradient strength value for the particular pixel, denoted G(x,y), as the square root of the sum of the squares of the horizontal gradient value and the vertical gradient value, e.g., as:

$$G(x,y) = \sqrt{G_h^2(x,y) + G_v^2(x,y)}.$$

In various implementations, the image processing system determines the gradient strength value by other means, such as the arithmetic mean of the horizontal gradient value and vertical gradient value, the quadratic mean of the horizontal gradient value and vertical gradient value (proportional to the above by a constant), the cubic mean of the horizontal gradient value and the vertical gradient value, or the maximum of the horizontal gradient value and the vertical gradient value.

In various implementations, the image processing system determines the gradient value using 5×5 Sobel operators or larger Sobel operators. In various implementations, the image processing system determines the gradient value using other edge detection methods, such as Canny, Laplacian of Gaussian, Difference of Gaussians, Harris, etc.

In various implementations, the gradient classifier 230 also uses the horizontal gradient value and the vertical gradient value to determine a gradient direction value. In various implementations, the gradient classifier 230 determines the gradient direction value for a pixel, denoted $\Theta(x,y)$, as the arctangent of the vertical gradient value divided by the horizontal gradient value, e.g., as:

$$\Theta(x, y) = \operatorname{atan}\left(\frac{G_v(x, y)}{G_h(x, y)}\right).$$

The method 300 continues, at block 330, with the image processing system classifying, based on the gradient value, the particular pixel into a flat class or one of a plurality of edge classes. Thus, the image processing system classifies the pixel into one of at least three classes. For example, in various implementations, the image processing system classifies the particular pixel into a flat class, a horizontal edge class, or a vertical edge class. As another example, in various implementations, the image processing system classifies the particular pixel into a flat class, a horizontal edge class, a vertical edge class, a slash edge class, or a backslash edge class.

The gradient value by which the image processing system classifies the particular pixel can be one or more of the gradient strength value, the horizontal gradient value, the vertical gradient value, or the gradient direction value. In various implementations, the gradient value can be other gradient values, such as a diagonal gradient value.

In various implementations, the image processing system classifies the particular pixel based on the gradient strength value. For example, in some embodiments, the image processing system classifies the particular pixel into a flat class if the gradient strength value is less than or equal to an edge threshold and classifies the particular pixel into one of a plurality of edge classes if the gradient strength value is greater than the edge threshold. The edge threshold can be based on a number of factors. In various implementations, the edge threshold is based on a noise value of the particular pixel derived from a noise model. In various implementations, the edge threshold is based on a distance of the particular pixel from the center of the image. In various implementations, the edge threshold is based on a light level of the image. In various implementations, the image processing system classifies, based on the gradient strength value and multiple edge thresholds, the particular pixel into a flat class, one of a first set of edge classes, or one of second set of edge classes.

In various implementations, the image processing system classifies the particular pixel based on the horizontal gradient value and the vertical gradient value. For example, in some embodiments, the image processing system classifies the particular pixel into a flat class if a difference between the horizontal gradient value and the vertical gradient value is below a difference threshold and, otherwise, classifies the particular pixel into a horizontal edge class if the vertical gradient value is greater than the horizontal gradient value and classifies the particular pixel into a vertical edge class if the horizontal gradient value is greater than the vertical gradient value.

In various implementations, the image processing system classifies the particular pixel based on the gradient direction value. For example, in some embodiments, as noted above, the image processing system classifies a pixel into a flat class based on the gradient strength value being less than or equal to an edge threshold and classifies a pixel into one of a plurality of edge classes based on the gradient strength value being greater than the edge threshold. In various implementations, the image processing system selects the one of the plurality of edge classes based on the gradient direction value. Thus, in some embodiments, the gradient classifier 230 classifies a pixel into a flat class if the gradient strength value is below an edge threshold, classifies the pixel into a horizontal edge class if the gradient strength value is above the edge threshold and the gradient direction value is within a first set of values (e.g., between $\pi/4$ and $3\pi/4$ or between $-\pi/4$ and $-3\pi/4$), and classifies the pixel into a vertical edge class if the gradient strength value is above the edge threshold and the gradient direction value is within a second set of values (e.g., between $-\pi/4$ and $\pi/4$ or between $3\pi/4$ and $-3\pi/4$).

Also, in some embodiments, the image processing system classifies a pixel into a flat class if the gradient strength value is below an edge threshold, classifies the pixel into a horizontal edge class if the gradient strength value is above the edge threshold and the gradient direction value is within a first set of values, classifies the pixel into a diagonal slash class if the gradient strength value is above the edge threshold and the gradient direction value is within a second set of values, classifies the pixel into a vertical class if the gradient strength value is above the edge threshold and the gradient direction value is within a third set of values, and classifies the pixel into a diagonal backslash class if the gradient strength value is above the edge threshold and the gradient direction value is within a fourth set of values.

Although the classification methods above employ 3×3 Sobel operators, in various implementations, 5×5 Sobel operators or larger Sobel operators can be used. In various implementations, other edge detection methods can be employed, such as Canny, Laplacian of Gaussian, Difference of Gaussians, Harris, etc., and used to classify the pixel into one of the set of classes.

The method 300 continues, in block 340, with the image processing system denoising the particular pixel based on the classification. In denoising the particular pixel, the image processing system determined a denoised value for the particular pixel. The denoised value can be used as the value for a corresponding pixel of a denoised image.

In various implementations, if the particular pixel is classified into a flat class, the image processing system applies an isotropic denoising to the pixel and if the particular pixel is classified into one of the plurality of edge classes, the image processing system applies a respective anisotropic denoising to the pixel. In various implementations, denoising the particular pixel based on the classification comprises denoising the particular pixel according to a flat denoising algorithm or one of a plurality of edge denoising algorithm. In various implementations, the flat denoising algorithm comprises isotropic denoising and the plurality of edge denoising algorithms each comprise a respective anisotropic denoising, e.g., denoising in a respective direction. For example, if the particular pixel is classified into a horizontal edge class, the denoiser 240 applies an anisotropic horizontal denoising to the pixel and, if the particular pixel is classified into a vertical edge class, the denoiser 240 applies an anisotropic vertical denoising to the particular pixel.

In various implementations, the image processing system applies a respective mask to the particular pixel based on the particular pixel being classified into a respective class. Accordingly, the image processing system stores a set of masks respectively corresponding the set of classes. Applying the mask includes determining a weighted average, defined by the mask, of a neighborhood of pixels surrounding the particular pixel. This weighted average becomes the denoised value for the particular pixel and can be used as the value for a corresponding pixel of a denoised image.

In various implementations, the masks are defined by a constant in a first dimension and a Gaussian in a second dimension. Thus, a class of 3×3 masks may be as follows:

$$M_1 = \frac{1}{9}\begin{bmatrix} 1 & 1 & 1 \\ 1 & 1 & 1 \\ 1 & 1 & 1 \end{bmatrix} \quad M_2 = \frac{1}{6}\begin{bmatrix} 0.5 & 0.5 & 0.5 \\ 1 & 1 & 1 \\ 0.5 & 0.5 & 0.5 \end{bmatrix} \quad M_3 = \frac{1}{6}\begin{bmatrix} 0.5 & 1 & 0.5 \\ 0.5 & 1 & 0.5 \\ 0.5 & 1 & 0.5 \end{bmatrix}$$

Thus, for isotropic denoising, where the particular pixel is classified into a flat class, the image processing system applies $M_1$, defined as constant in a first dimension and a constant in second dimension (e.g., a Gaussian with infinite width in the second dimension). For anisotropic denoising, where the particular pixel is classified into a horizontal edge class, the image processing system applies $M_2$, defined as a constant in a horizontal dimension and a Gaussian (with a half-maximum width of two) in a vertical dimension. For anisotropic denoising, where the particular pixel is classified into a vertical edge class, the image processing system applies $M_3$, defined as a constant in a vertical dimension and a Gaussian (with a half-maximum width of two) in a horizontal direction.

Similarly, a class of 5×5 masks, including a flat mask, a horizontal edge mask, a vertical edge mask, a diagonal slash mask, and a diagonal backslash mask, may be, approximately, as follows:

$$M_1 = \frac{1}{9}\begin{bmatrix} 1 & 1 & 1 \\ 1 & 1 & 1 \\ 1 & 1 & 1 \end{bmatrix} \quad M_2 = \frac{1}{6}\begin{bmatrix} 0.5 & 0.5 & 0.5 \\ 1 & 1 & 1 \\ 0.5 & 0.5 & 0.5 \end{bmatrix} \quad M_3 = \frac{1}{6}\begin{bmatrix} 0.5 & 1 & 0.5 \\ 0.5 & 1 & 0.5 \\ 0.5 & 1 & 0.5 \end{bmatrix}$$

$$M_4 = \frac{1}{4.8}\begin{bmatrix} 0.1 & 0.4 & 1 \\ 0.4 & 1 & 0.4 \\ 1 & 0.4 & 0.1 \end{bmatrix} \quad M_5 = \frac{1}{4.8}\begin{bmatrix} 1 & 0.4 & 0.1 \\ 0.4 & 1 & 0.4 \\ 0.1 & 0.4 & 1 \end{bmatrix}$$

In various implementations, rather than using a fixed set of masks, the image processing system generates a mask to be applied to the pixel based on the gradient value. For example, in various implementations, the image processing system can generate a mask based on the gradient strength value, the horizontal gradient value, the vertical gradient value, or the gradient direction value. The image processing system can generate a mask that is defined by a constant in a first dimension and a Gaussian in a second dimension, where a width of the Gaussian is based on the gradient value, e.g., the gradient strength value.

Figure 4:
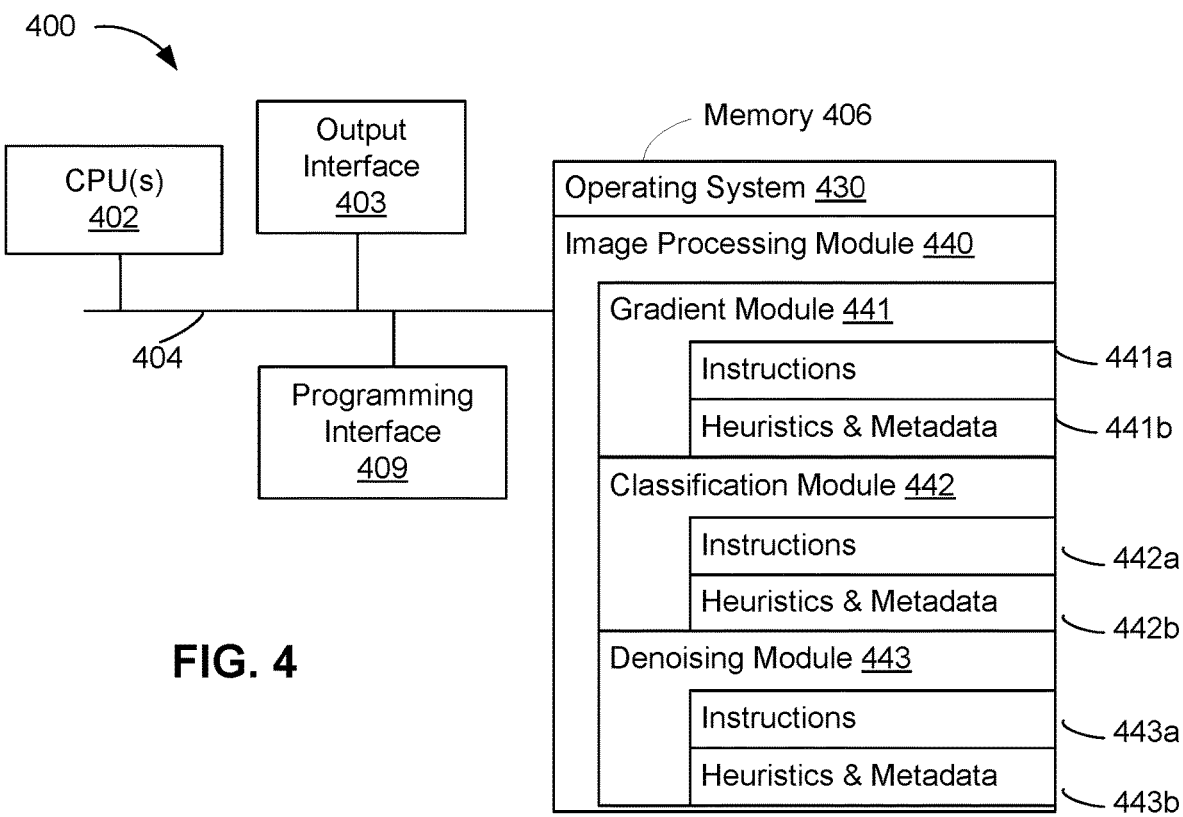
FIG. 4 is a block diagram of a computing device in accordance with some implementations.

FIG. 4 is a block diagram of a computing device 400 in accordance with some implementations. In some implementations, the computing device 400 corresponds to the at least a portion of the electronic device 100 of FIG. 1 and performs one or more of the functionalities described above with respect to the electronic device. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 400 includes one or more processing units (CPU's) 402 (e.g., processors), one or more input/output interfaces 403 (e.g., a network interface and/or a sensor interface), a memory 406, a programming interface 409, and one or more communication buses 404 for interconnecting these and various other components.

In some implementations, the communication buses 404 include circuitry that interconnects and controls communications between system components. The memory 406 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406 comprises a non-transitory computer readable storage medium. Moreover, in some implementations, the memory 406 or the non-transitory computer readable storage medium of the memory 406 stores the following programs, modules and data structures, or a subset thereof including an optional operating system 430 and an image processing module 440. In some implementations, one or more instructions are included in a combination of logic and non-transitory memory. The operating system 430 includes procedures for handling various basic system services and for performing hardware dependent tasks. In some implementations, the image processing module 440 is configured to denoise an image. To that end, the image processing module 440 includes a gradient module 441, a classification module 442, and a denoising module 443.

In some implementations, the gradient module 441 is configured to determine, for a particular pixel of a plurality of pixels of an obtained image, a gradient value. To that end, the gradient module 441 includes a set of instructions 441a and heuristics and metadata 441b. In some implementations, the classification module 442 is configured to classify, based on the gradient value, the particular pixel into a flat class or one of a plurality of edge classes. To that end, the classification module 442 includes a set of instructions 442a and heuristics and metadata 442b. In some implementations, the denoising module 443 is configured to denoise the particular pixel based on the classification. To that end, the classification module 443 includes a set of instructions 443a and heuristics and metadata 443b.

Although the image processing module 440, the gradient module 441, the classification module 442, and the denoising module 443 are illustrated as residing on a single computing device 400, it should be understood that in other embodiments, any combination of the image processing module 440, the gradient module 441, the classification module 442, and the denoising module 443 can reside in separate computing devices in various implementations. For example, in some implementations each of the image processing module 440, the gradient module 441, the classification module 442, and the denoising module 443 reside on a separate computing device or in the cloud.

Moreover, FIG. 4 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device.

The various functions disclosed herein may be embodied in such program instructions, although some or all of the disclosed functions may alternatively be implemented in application-specific circuitry (e.g., ASICs or FPGAs or GP-GPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    obtaining an image comprising a plurality of pixels;
    determining, for a first pixel of the plurality of pixels, a first gradient value, and determining, for a second pixel of the plurality of pixels, a second gradient value;
    classifying, based on the first gradient value, the first pixel into a flat class, and classifying, based on the second gradient value, the second pixel into one of a plurality of edge classes, wherein the plurality of edge classes includes a vertical edge class, a horizontal edge class, and a diagonal edge class, wherein classifying the first and second pixels is further based on at least one of: a noise value of the first or second pixel derived from a noise model and a distance of the first or second pixel from a center of the image; and
    denoising the first and second pixels based on the classification, wherein the denoising includes isotropically denoising the first pixel, and anisotropically denoising the second pixel in a respective direction, wherein anisotropically denoising the second pixel in the respective direction includes:
        applying an anisotropic vertical denoising to the second pixel based on classifying the second pixel into the vertical edge class;
        applying an anisotropic horizontal denoising to the second pixel based on classifying the second pixel into the horizontal edge class; and
        applying an anisotropic diagonal denoising to the second pixel based on classifying the second pixel into the diagonal edge class.

2. The method of claim 1, wherein determining the first gradient value comprises determining a first horizontal gradient value and a first vertical gradient value, wherein determining the second gradient value comprises determining a second horizontal gradient value and a second vertical gradient value, and wherein the classification is based on the first and second horizontal gradient values and the first and second vertical gradient values.

3. The method of claim 2, wherein determining the first and second horizontal gradient values and the first and second vertical gradient values comprises applying a Sobel operator to the plurality of pixels.

4. The method of claim 1, wherein determining the first gradient value comprises determining a first gradient strength value, wherein determining the second gradient value comprises determining a second gradient strength value, and wherein the classification is based on the first and second gradient strength values.

5. The method of claim 4, wherein the first pixel is classified into the flat class based on the first gradient strength value being less than or equal to an edge threshold, and wherein the second pixel is classified into one of the plurality of edge classes based on the second gradient strength value being greater than the edge threshold.

6. The method of claim 5, wherein the edge threshold is based on at least one of: the noise value of the first or second pixel derived from the noise model, the distance of the first or second pixel from the center of the image, and the light level of the image.

7. The method of claim 4, wherein the second pixel is classified into one of a first set of the plurality of edge classes based on the second gradient strength value being less than or equal to a strong-edge threshold or is classified into one of a second set of the plurality of edge classes based on the second gradient strength value being greater than the strong-edge threshold.

8. The method of claim 4, wherein determining the second gradient value comprises determining a gradient direction value, wherein the second pixel is classified into the one of the plurality of edge classes based on the gradient direction value.

9. The method of claim 1, wherein denoising the first and second pixels based on the classification comprises denoising the first and second pixels according to a flat denoising algorithm or one of a plurality of edge denoising algorithm.

10. The method of claim 1, wherein denoising the first and second pixels based on the classification comprising applying respective masks to the first and second pixels based on the first and second pixels being classified into respective classes.

11. The method of claim 10, wherein the applying the respective masks to the first and second pixels comprises determining a weighted average, defined by the respective masks, of a neighborhood of pixels of the plurality of pixels surrounding the first and second pixels.

12. The method of claim 1, wherein the image is one component of an RGB image.

13. The method of claim 1, wherein the image is a frequency band component of a wideband image.

14. The method of claim 13, further comprising:
    obtaining a wideband image, wherein the wideband image is a component of a color image comprising a plurality of components;
    multiplexing the wideband image to produce a plurality of frequency components; and
    down-sampling at least one of the plurality of frequency components, wherein the image is a down-sampled one of the plurality of frequency components.

15. The method of claim 1, wherein applying the anisotropic vertical denoising includes applying a vertical edge mask to the second pixel based on classifying the second pixel into the vertical edge class, wherein applying the anisotropic horizontal denoising includes applying a horizontal edge mask to the second pixel based on classifying the second pixel into the horizontal edge class, and wherein applying the anisotropic diagonal denoising includes applying a diagonal slash mask or a diagonal backslash mask to the second pixel based on classifying the second pixel into the diagonal edge class.

16. The method of claim 15, wherein the vertical edge mask is defined by a constant in a vertical dimension and a Gaussian in a horizontal direction, and wherein the horizontal edge mask is defined by a constant in a horizontal dimension and a Gaussian in a vertical direction.

17. The method of claim 16, wherein a width of the Gaussian is based on the second gradient value.

18. A non-transitory computer-readable medium having instructions encoded thereon that, when executed by one or more processors of an electronic device, causes the electronic device to perform a method comprising:
   obtaining an image comprising a plurality of pixels;
   determining, for a first pixel of the plurality of pixels, a first gradient value, and determining, for a second pixel of the plurality of pixels, a second gradient value;
   classifying, based on the first gradient value, the first pixel into a flat class, and classifying, based on the second gradient value, the second pixel into one of a plurality of edge classes, wherein the plurality of edge classes includes a vertical edge class, a horizontal edge class, and a diagonal edge class, wherein classifying the first and second pixels is further based on at least one of: a noise value of the first or second pixel derived from a noise model and a distance of the first or second pixel from a center of the image; and
   denoising the first and second pixels based on the classification, wherein the denoising includes isotropically denoising the first pixel, and anisotropically denoising the second pixel in a respective direction, wherein anisotropically denoising the second pixel in the respective direction includes:
      applying an anisotropic vertical denoising to the second pixel based on classifying the second pixel into the vertical edge class;
      applying an anisotropic horizontal denoising to the second pixel based on classifying the second pixel into the horizontal edge class; and
      applying an anisotropic diagonal denoising to the second pixel based on classifying the second pixel into the diagonal edge class.

19. A system comprising:
a non-transitory memory; and
one or more processors configured to:
   obtain an image comprising a plurality of pixels;
   determine, for a first pixel of the plurality of pixels, a first gradient value, and determine, for a second pixel of the plurality of pixels, a second gradient value;
   classify, based on the first gradient value, the first pixel into a flat class, and classify, based on the second gradient value, the second pixel into one of a plurality of edge classes, wherein the plurality of edge classes includes a vertical edge class, a horizontal edge class, and a diagonal edge class, wherein classifying the first and second pixels is further based on at least one of: a noise value of the first or second pixel derived from a noise model and a distance of the first or second pixel from a center of the image; and
denoise the first and second pixels based on the classification, wherein the denoising includes isotropically denoising the first pixel, and anisotropically denoising the second pixel in a respective direction, wherein anisotropically denoising the second pixel in the respective direction includes:
   applying an anisotropic vertical denoising to the second pixel based on classifying the second pixel into the vertical edge class;
   applying an anisotropic horizontal denoising to the second pixel based on classifying the second pixel into the horizontal edge class; and
   applying an anisotropic diagonal denoising to the second pixel based on classifying the second pixel into the diagonal edge class.

* * * * *